United States Patent [19]

Scourtes

[11] 4,391,131

[45] Jul. 5, 1983

[54] TRANSMISSION TESTING APPARATUS AND METHOD

[75] Inventor: George Scourtes, Plymouth, Mich.

[73] Assignee: The Allen Group Inc., Saginaw, Mich.

[21] Appl. No.: 205,609

[22] Filed: Nov. 10, 1980

[51] Int. Cl.³ ............................................. G01M 13/02
[52] U.S. Cl. ......................................... 73/118; 73/162
[58] Field of Search ..................... 73/118, 162, 862.09, 73/862.17

[56] References Cited

U.S. PATENT DOCUMENTS

| | | | |
|---|---|---|---|
| 2,516,748 | 7/1950 | Boice | 73/162 |
| 2,981,103 | 4/1961 | Livezey | 73/162 |
| 3,060,730 | 10/1962 | Lucia | 73/118 |
| 3,298,228 | 1/1967 | Oltean et al. | 73/162 |
| 3,451,262 | 6/1969 | McPeek et al. | 73/118 |
| 3,690,168 | 9/1972 | Petersen | 73/162 |
| 4,159,642 | 7/1979 | Hudson et al. | 73/118 |

*Primary Examiner*—Charles A. Ruehl
*Attorney, Agent, or Firm*—Learman & McCulloch

[57] ABSTRACT

Apparatus and methods for testing a front wheel drive automotive transmission having a drive input adapted for connection to the engine driveshaft and two driven outputs adapted for coupling to the axles of the front wheels. The testing apparatus comprises a drive input shaft corresponding to the engine driveshaft and a pair of output shafts corresponding to the vehicle axles. Each output shaft is coupled to a single driven shaft by a positive drive, non-slip coupling mechanism so that neither of the output shafts can rotate at a speed different from that of the other. The single, driven shaft is provided with a flywheel which simulates inertial forces. The input driveshaft is coupled to a variable speed motor and the single, driven shaft is coupled to a similar motor which is operable at selected speeds to impose varying load conditions on the transmission. The positive drive couplings preferably rotate the single, driven shaft at a speed greater than that of the driving output shafts so as to minimize the mass of the flywheel.

12 Claims, 2 Drawing Figures

TRANSMISSION TESTING APPARATUS AND METHOD

BACKGROUND OF THE INVENTION

In a front wheel drive vehicle the transmission receives its driving force from the engine's driveshaft and, by means of gearing or torque converters, effects driving of two output shafts to which the front axles of the vehicle are connected. The testing of transmissions for front wheel drive vehicles presents problems different from those encountered in the testing of transmissions used in vehicles having a front engine coupled to a differential at the rear of the vehicle. This is because a transmission interposed between an engine driveshaft and a differential requires only a single output shaft, whereas a transmission for a front wheel drive vehicle must have two output shafts to effect driving of the two front wheels of the vehicle.

In the testing of transmissions it is imperative that the transmission under test not be subjected to damage as a result of the testing operations. At the same time, however, the testing must be accomplished under conditions which closely simulate the conditions that will be encountered in actual use of the transmission after it has been installed on a vehicle. Apparatus and methods according to the invention accomplish both of these objectives.

SUMMARY OF THE INVENTION

Transmission testing apparatus constructed in accordance with the invention comprises an input driveshaft that simulates an engine driveshaft which may be coupled to the drive input of a transmission to be tested. The input driveshaft is coupled to a variable speed electric motor so as to enable the transmission to be driven at variable speeds. The testing apparatus also includes a pair of output shafts which may be coupled to the drive outputs of the transmission. Each output shaft of the testing apparatus is drivingly connected by a nonslip, positive drive train to a single driven shaft, thereby ensuring that neither of the transmission drive outputs will rotate at a speed different from the other. The single driven shaft thus simulates the road or other surface on which a vehicle is driven.

The single driven shaft also is coupled to a flywheel which simulates the weight of the vehicle in which the transmission may be mounted. The single driven shaft also is coupled to a variable speed electric motor which is operable to impose varying load conditions on the transmission.

DESCRIPTION OF THE DRAWINGS

Apparatus constructed in accordance with the presently preferred embodiment of the invention is illustrated in the accompanying drawings, wherein.

DETAILED DESCRIPTION

Figure 1:
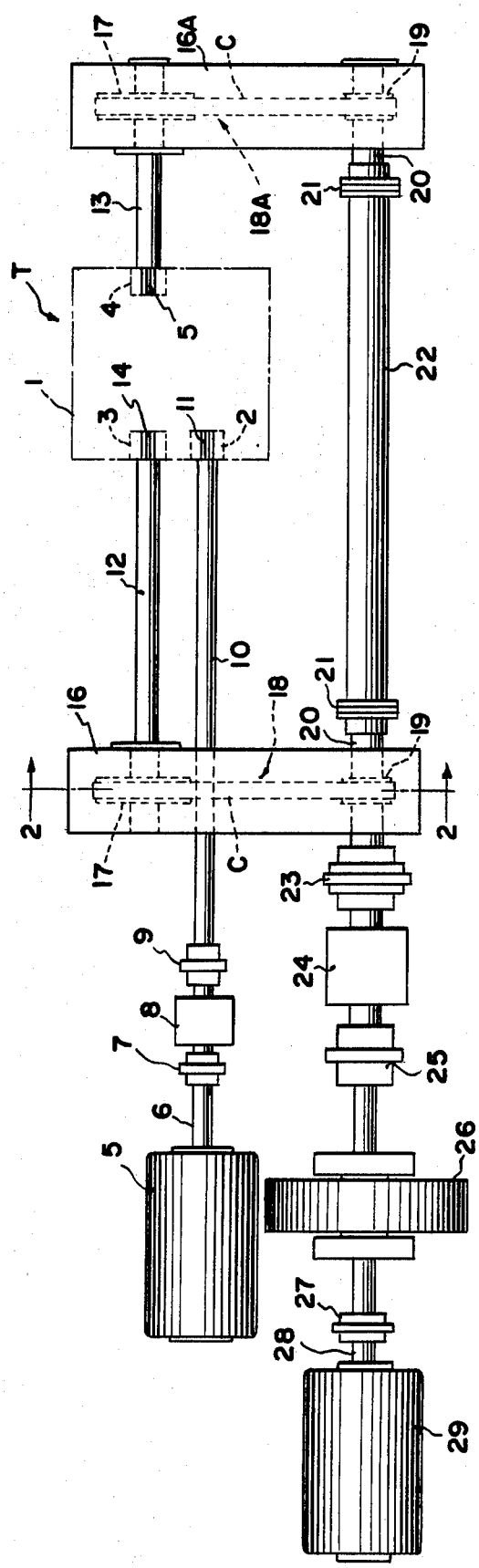
FIG. 1 is a simplified, diagrammatic view of the testing apparatus.
Figure 2:
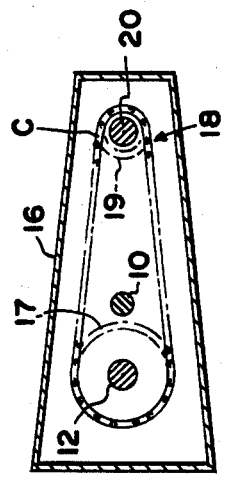
FIG. 2 is a sectional view taken on the line 2—2 of FIG. 1.

Testing apparatus according to the invention is adapted for use in the testing of a transmission T of the kind used in a front wheel drive automotive vehicle. The transmission T has a case 1 in which is an input drive 2 adapted for connection to the vehicle engine's driveshaft and coupled by gearing or torque converters to a pair of drive outputs 3 and 4 adapted for connection to the front wheel axles of the vehicle. The transmission T itself forms no part of the invention and may be any one of a number of different kinds, both manual shift and automatic shift.

The testing apparatus comprises a variable speed electric drive motor 5 which simulates a vehicle engine and has a driveshaft 6 connected by a coupling 7 to an input torque meter or transducer 8 which, in turn, is coupled by a coupling 9 to an input driveshaft 10 having a free end 11 that is splined or otherwise configured to be drivingly connected to the transmission drive input 2.

The testing apparatus also includes two driven output shafts 12 and 13 having free ends 14 and 15, respectively, splined or otherwise configured to be drivingly coupled to the transmission outputs 3 and 4. The opposite end of the shaft 12 is journaled in a housing 16 and is keyed or otherwise fixed to a sprocket wheel 17 of a nonslip, positive drive assembly 18 which also includes a sprocket wheel 19 fixed on a stub shaft 20 journaled in the housing 16. A sprocket chain C is trained around the wheels 17 and 19. That end of the shaft 13 opposite the free end 15 is journaled in a housing 16A similar to the housing 16 and within which is a drive assembly 18A identical to the assembly 18 and having parts identified by the same reference characters.

Each stub shaft is spaced from and parallel to the associated shafts 12 and 13. This makes it possible to extend the driveshaft 10 through the housing 16 and conserve space. The sprocket wheels 19 preferably are one-half the diameter of the sprocket wheels 17 so that the stub shafts 20 rotate at a speed twice that of the shafts 12 and 13.

Each of the stub shafts 20 is drivingly coupled, by couplings 21, to a single driven shaft 22 that is driven by the stub shafts 20 and at the same speed as that of the latter.

One of the stub shafts 20 is joined, by a coupling 23, to a torque meter or transducer 24 which is connected by a coupling 25 to a flywheel 26 which, in turn, is joined by a coupling 27 to the driveshaft 28 of a reversible, variable speed electric motor 29.

To condition the testing apparatus for operation, the input driveshaft 10 is fitted to the drive input 2 of the transmission and the output shafts 12 and 13 are fitted to the transmission outputs 3 and 4, respectively. The motor 5 then may be energized to rotate in one direction at a selected rate of speed to simulate driving of the transmission T by a vehicle engine. The torque applied to the transmission by the motor 5 may be determined by the torque meter 8.

Driving torque applied to the transmission T via the input driveshaft 10 will effect driving of the output drive shafts 12 and 13 in a direction and at a speed depending upon the position in which the transmission gear selector is located. For example, if the gear selector is in its first, second, or drive position, the shafts 12 and 13 will be driven in one direction at a speed proportional to the input to output ratio of the transmission for such gear selector position. If the gear selector is in the reverse position, the shafts 12 and 13 will be driven in the opposite direction, and at a speed proportional to the speed input torque. Alternatively, if the gear selector is in its neutral or park position, neither of the shafts 12 and 13 should rotate unless there is a defect in the transmission.

Rotation of the shafts 12 and 13 will be imparted via the positive drive mechanisms 18 and 18A to the single, driven shaft 22 so as to rotate the latter in the same direction that the shafts 12 and 13 rotate and at a speed proportional to the ratio between the sprocket wheels 17 and 19. The shaft 22, together with the drive mechanisms 18 and 18A, makes it impossible for either shaft 12 and 13 to rotate without corresponding rotation of the other, and the nonslip construction of the drive mechanisms makes it impossible for either shaft to rotate at a speed different from that of the other. Thus, the shaft 22 functions in the same manner as the surface of a road or the like on which a vehicle's wheels are supported.

Changes in the speed of rotation of the shaft 22 are resisted inertially by the flywheel 26 in the same manner that the weight of a vehicle acts on the transmission. It is possible, however, to impose varying loads on the transmission by driving the motor 29 in either the same or different direction as that of the motor 5 and at either the same or different speeds. At all speeds the torque to which the shaft 22 is subjected may be measured by the torque meter or transducer 24.

It will, of course, be understood that various known instruments and sensors will be connected to the transmission under test to check for leaks, vibration, and other factors which determine whether a transmission is or is not acceptable. Such instruments and sensors are not part of the invention, however, and accordingly are not illustrated in the drawing.

The disclosure is representative of a presently preferred apparatus and methods according to the invention, but is intended to be illustrative rather than definitive thereof. The invention is defined in the claims.

I claim:

1. A method of testing a front wheel drive vehicle transmission having a rotary input and two rotary outputs, said method comprising coupling drive means to said input; coupling driven means to each of said outputs; coupling each of said driven means to a single rotary member so that neither output can rotate relatively to the other; and driving said drive means.

2. The method according to claim 1 including imposing a load on said rotary member.

3. The method according to claim 2 wherein said load is inertial.

4. The method according to claim 2 wherein said load is imposed by coupling second drive means to said rotary member and driving said second drive means at a rate different from that of the first mentioned drive means.

5. The method according to claim 1 including driving said rotary member at a rate of speed different from that of said driven means.

6. The method according to claim 5 wherein said rotary member is driven at a rate twice that of said driven means.

7. Apparatus for testing an automotive transmission having a drive input and a pair of drive outputs each of which may be driven in a selected one of two different directions from the input, said apparatus comprising an input drive shaft for connection to the transmission drive input; a pair of output shafts for connection to the respective drive outputs of the transmission; a single driven shaft; means coupling each of said output shafts to said single driven shaft; driving means coupled to said input drive shaft for driving the latter; and load driving means coupled to said single driven shaft for imposing a load on the latter, said coupling means comprising a toothed sprocket wheel fixed on each of said output shafts, a pair of companion sprocket wheels fixed on said single driven shaft, and sprocket chains drivingly connecting the associated sprocket wheels.

8. Apparatus for testing an automotive transmission having a pair of drive outputs each of which may be driven in a selected one of two different directions from a single drive input, said apparatus comprising an input drive shaft for connection to the transmission drive input; a pair of output shafts for connection to the respective drive outputs of the transmission; a single driven shaft; non-slip, positive drive transmitting means coupling said driven shaft to each of said output shafts and precluding any rotation of either one of said output shafts without corresponding rotation of the other in the same direction and at the same speed of rotation as said one of said output shafts; and means coupled to said driven shaft for imposing a load on the latter.

9. Apparatus according to claim 8 wherein said load imposing means comprises a flywheel fixed to said single driven shaft for rotation therewith.

10. Apparatus according to claim 8 wherein said coupling means effects driving of said single driven shaft at a speed different from that of said output shafts.

11. Apparatus according to claim 10 wherein said single driven shaft is driven at a speed greater than that of said output shafts.

12. Apparatus according to claim 10 wherein said single driven shaft has a speed substantially twice that of said output shafts.

* * * * *